United States Patent
Daiku

(10) Patent No.: US 7,349,156 B2
(45) Date of Patent: Mar. 25, 2008

(54) DISPLAY DEVICE FOR DISPLAYING THREE-DIMENSIONAL IMAGE

(75) Inventor: Yasuhiro Daiku, Iruma (JP)

(73) Assignee: Casio Computer Co., Ltd., Tokyo (JP)

( * ) Notice: Subject to any disclaimer, the term of this patent is extended or adjusted under 35 U.S.C. 154(b) by 73 days.

(21) Appl. No.: 11/137,227

(22) Filed: May 24, 2005

(65) Prior Publication Data

US 2005/0264882 A1 Dec. 1, 2005

(30) Foreign Application Priority Data

May 26, 2004 (JP) ............................. 2004-155877

(51) Int. Cl.
*G02B 27/26* (2006.01)
*G02B 27/22* (2006.01)
*H04N 15/00* (2006.01)

(52) U.S. Cl. .................... 359/465; 359/462; 348/57; 348/58

(58) Field of Classification Search ........... 359/465, 359/630; 353/7, 8; 345/7, 8, 9; 349/15; 348/57, 58
See application file for complete search history.

(56) References Cited

U.S. PATENT DOCUMENTS 3,248,165 A * 4/1966 Marks et al. .................. 352/58

6,653,989 B2 * 11/2003 Nakanishi ...................... 345/7

FOREIGN PATENT DOCUMENTS

| JP | 3-119889 A | 5/1991 |
|---|---|---|
| JP | 7-5455 A | 1/1995 |
| JP | 10-268230 A | 10/1998 |

OTHER PUBLICATIONS

Related U.S. Appl. No. 11/137,226, filed May 24, 2005; Inventor: Yasuhiro Daiku; Title: Liquid Crystal Display Device.

* cited by examiner

*Primary Examiner*—Audrey Chang
(74) *Attorney, Agent, or Firm*—Frishauf, Holtz, Goodman & Chick, P.C.

(57) ABSTRACT

A display device includes a screen having opposite ends and a curved surface between the opposite ends, the curved surface being protrudingly curved toward a side opposite to a display observation side. First and second display elements are respectively provided at the opposite ends of the screen, and display two different sub-images constituting one image. The display elements are arranged in such a manner that sub-image lights of these sub-images are transmitted toward an inner side from corresponding areas on an outer side of the curved surface in end sections of the screen to be applied to the inner side of the curved surface of the screen and sub-image lights are reflected on the inner surface of the curved surface of the screen to enter right and left eyes of an observer, respectively.

10 Claims, 4 Drawing Sheets

DISPLAY DEVICE FOR DISPLAYING THREE-DIMENSIONAL IMAGE

CROSS-REFERENCE TO RELATED APPLICATIONS

This application is based upon and claims the benefit of priority from prior Japanese Patent Application No. 2004-155877, filed May 26, 2004, the entire contents of which are incorporated herein by reference.

BACKGROUND OF THE INVENTION

1. Field of the Invention

The present invention relates to a display device which can display a three-dimensional image.

2. Description of the Related Art

As display devices which display a three-dimensional image, there are conventionally liquid crystal display devices which display an image for a right eye by using pixels provided every other columns in a liquid crystal display element and an image for a left eye by using pixels provided every other remaining columns and allows observation of the image for a right eye and the image for a left eye with respect to a right eye and a left eye of an observer through a lenticular lens which allocates lights emitted from the pixels in one row of the liquid crystal display element and lights emitted from the pixels in the other row in a direction of the right eye and a direction of the left eye of the display observer, or a parallax barrier in which a plurality of light transmission sections and light prevention sections parallel to the pixel rows in the liquid crystal display element are alternately aligned in a stripe form (Jpn. Pat. Appln. KOKAI Publication No. 3-119889, Jpn. Pat. Appln. KOKAI Publication No. 7-005455, Jpn. Pat. Appln. KOKAI Publication No. 10-268230).

In the above-described conventional liquid crystal display device, a dot pitch of images for both right and left eyes is as rough as twofold of a pixel pitch of the liquid crystal display element in order to display an image for a right eye by using the pixels provided every other columns in the liquid crystal display element and display an image for a left eye by using the pixels provided every other remaining columns, and hence a three-dimensional image with a high resolution cannot be displayed.

Further, in the conventional liquid crystal display device, the lenticular lens having a lens pitch corresponding to the pixel pitch of the liquid crystal display element, or the parallax barrier having a transmission section pitch corresponding to the pixel pitch must be arranged in such a manner that each lens section or the transmission section must be arranged in a predetermined angular relationship with respect to the pixels in each row in the liquid crystal display element, and hence production is difficult.

BRIEF SUMMARY OF THE INVENTION

It is an object of the present invention to provide a display device which can display a three-dimensional image with a high resolution and can be readily manufactured.

According to a first aspect of the present invention, there is provided a display device comprising:

a screen having opposite ends and a curved surface between the opposite ends, the curved surface being protrudingly curved toward a side opposite to a display observation side; and first and second display elements which are respectively provided at the opposite ends of the screen, and display two different sub-images constituting one image, the display elements being arranged in such a manner that sub-image lights of these sub-images are transmitted toward an inner side from corresponding areas on an outer side of the curved surface in end sections of the screen to be applied to the inner side of the curved surface of the screen and sub-image lights are reflected on the inner surface of the curved surface of the screen to enter right and left eyes of an observer, respectively.

In this display device, two different sub-images constituting one image are respectively displayed in the first and second display elements, and image lights of these images are allowed to enter the screen from the outside of the curved surface of this screen to be transmitted therefrom and reflected in directions of right and left eyes of an observer on the inner surface of the curved surface, thereby enabling the observer to observe a three-dimensional image having a spatial effect like a real thing.

In this display device, it is desirable that each of the first and second display elements comprises an image display element which allows an image light in one of two different polarization states to exit toward the screen and the screen is formed of an optical film having optical characteristics of transmitting a light in one of different polarization states and reflecting a light in the other polarization state.

Further, in this display device, preferably, the first and second display elements arranged in such a manner that respective sub-image lights are transmitted through areas of the screen facing the first and second displaying means to fall on the inner side of the curved surface in an area opposite to the display element apart from the center of the screen and respective image lights are reflected so that the sub-image light of the display element arranged on one side of the screen is allowed to exit in a direction of an eye of an observer on the other side.

Furthermore, in this display device, each of the first and second display elements includes one image display element which allows an image light consisting of a linearly polarized light having a polarization plane in a predetermined direction to exit toward the screen, and the screen can be formed of a reflection polarizing film which has a transmission axis and a reflection axis in two directions orthogonal to each other in a plane parallel to a film surface thereof and has optical characteristics of transmitting a linearly polarized light component parallel to the transmission axis and reflecting a linearly polarized light component parallel to the reflection axis in regard to two linearly polarized light components orthogonal to each other in an incident light.

An observer can observe a three-dimensional image by allowing an image light for a right eye and an image light for a left eye constituting one three-dimensional image to exit from the image display elements of the first and second display elements toward the screen.

In this display device, the first and second display elements are arranged in such a manner that a polarization plane of an image light exiting from the display element of each of the first and second display elements becomes substantially parallel with the transmission axis of the screen, and each of the first and second display element comprises: a liquid crystal display element including a liquid crystal cell which has a pair of substrates having electrodes formed on opposing inner surfaces thereof and a liquid crystal arranged between the pair of electrodes, and a pair of polarizing plates arranged on both sides of this liquid crystal cell; and a light source which is arranged on a side opposite to the surface of the liquid crystal display element facing the screen and allows an illumination light to enter the liquid crystal display element. In this case, preferably, of the pair of polarizing plates, the polarizing plate arranged on the side facing the screen is arranged in such a manner that the transmission axis thereof is substantially parallel with the screen, the light source comprises a surface light source which is arranged on the side opposite to the surface of the liquid crystal display element facing the screen and irradiates the entire surface of the liquid crystal display element with a light having a substantially homogeneous brightness degree, the two different sub-images which are displayed in the two liquid crystal display elements comprise a right-eye image and a left-eye image, and a display drive circuit which displays the right-eye image in one of first and second displaying means and displays the left-eye image in the other means is further provided.

According to a second aspect of the present invention, there is provided a display device comprising:

screen means which includes a film surface having a transmission axis and a reflection axis in two directions orthogonal to each other in a plane parallel to the film surface, the screen means having optical characteristics of transmitting a linearly polarized light component parallel to the transmission axis and reflecting a linearly polarized light component parallel to the reflection axis in regard to two linearly polarized light components orthogonal to each other in an incident light, and the film surface being protrudingly curved toward a side opposite to a display observation side;

first and second displaying means each of which has a liquid crystal display element which controls transmission of a light to display an image and a light source which supplies a light to the liquid crystal display element, and allows an image light including a linearly polarized light from the liquid crystal display element to exit therefrom; and display driving means for displaying a right-eye image and a left-eye image which form one three-dimensional image in the first and second displaying means, respectively, wherein the first and second displaying means are respectively arranged at both end sides of a curved surface formed by the screen means in such a manner that image lights of the right-eye image and the left-eye image are transmitted from on outer side toward an inner side of the curved surface at end sections of the screen means and applied to the inner side of the curved surface of the screen means, and each image light is reflected on an inner surface of the curved surface of the screen means to enter one of right and left eyes of an observer.

In this display device, a right-eye image and a left-eye image constituting one three-dimensional image are formed of linearly polarized lights and allowed to exit to the first and second display elements, and these image lights are allowed to enter the film surface from the outside of a curved surface of the screen means to be transmitted through the screen means, the screen means having optical characteristics of transmitting a linearly polarized light component parallel to the transmission axis and reflecting a linearly polarized light component parallel to the reflection axis in regard to two linearly polarized light components orthogonal to each other in an incident light. The image lights are then reflected on the inner surface of the curved film surface in directions of right and left eyes of an observer, thereby enabling the observer to observe a three-dimensional image having a spatial effect like a real thing.

In this display device, the liquid crystal display element of each of the first and second displaying means may includes a liquid crystal cell having a pair of substrates having electrodes formed on opposing inner surfaces thereof and a liquid crystal arranged between the pair of substrates; and a pair of polarizing plates arranged on the both sides of the liquid crystal cell. Of the pair of polarizing plates, the polarizing plate arranged on the side facing the screen means is arranged in such a manner the transmission axis thereof becomes substantially parallel with the transmission axis of the screen means. Furthermore, the first and second displaying means are arranged in such a manner that each image light is transmitted through an area of the screen means facing each of the first and second displaying means to fall on the inner side of the curved film surface in an area opposite to the display element from the center of the screen means, each image light is reflected and the image light of the display element arranged on one side of the screen is allowed to exit in a direction of one eye of an observer on the other side.

According to a third aspect of the present invention, there is provided a display device comprising:

a first screen which has a transmission axis and a reflection axis in two directions orthogonal to each other in a plane parallel to a surface thereof, and has optical characteristics of transmitting a linearly polarized light parallel to the transmission axis and reflecting a linearly polarized light parallel to the reflection axis in two linearly polarized lights orthogonal to each other in an incident light;

a second screen which is arranged behind the first screen with a gap therebetween as seen from an observation side, and reflects the light transmitted through the first screen of the incident light which has entered/fallen on the first screen from the observation side thereof; and first and second image display elements each of which has a liquid crystal display element which controls transmission of a light to display an image and a surface light source which supplies a light to the liquid crystal display element, is arranged at each of both ends of the first and second screens on the observation side in such a manner that each image light exiting from each liquid crystal display element toward front surfaces of the first and second screens is reflected by one of the first and second screens to exit toward the observation side, and allows a linearly polarized image light from each liquid crystal display element to exit therefrom.

In this display device, images having the same pattern are respectively displayed in the first and second image displaying means, and the image lights from these image displaying means are allowed to enter/fall on the screen from the front surface thereof. As a result, the image light exiting from one image displaying means is reflected toward the observation side by the front screen, and the image light exiting from the other image displaying means is transmitted through the front screen to be reflected to the observation side by the rear screen. Consequently, a display observer can observe a three-dimensional image having a relatively deep depth in which the image reflected by the front screen and the image reflected by the rear screen are superposed.

In this display device, it is preferable that a polarization plane of the linearly polarized light exiting from one of the first and second image display elements is set to be substantially parallel with the reflection axis of the first screen and a polarization plane of the linearly polarized light exiting from the other image display element is set to be substantially parallel with the transmission axis of the first screen.

Moreover, in this display device, it is desirable that each of the first and second screens forms a curved surface which is curved to a side opposite to the display observation side and the first and second image display elements are arranged on the inner surfaces on the curved surfaces of the first and second screens on the observation side.

Additionally, in this display device, it is desirable that display driving means for displaying different images in the first and second image displaying means is further provided, the display driving means displays images having substantially the same images and different brightness levels in the first and second image display elements, a background image is displayed in the image display element which allows an image light reflected by the second screen to exit therefrom and a foreground image is displayed in the image display element which allows an image light reflected by the first screen to exit therefrom.

In the display device according to the present invention, a right-eye image and a left-eye image constituting one three-dimensional image are formed of linearly polarized lights and allowed exit toward the first and second display elements, and these image lights are allowed to enter the curved screen from the outside of the curved surface thereof and transmitted through the screen, the screen having optical characteristics of transmitting a linearly polarized light component parallel to the transmission axis and reflecting a linearly polarized light component parallel to the reflection axis in regard to two linearly polarized light components orthogonal to each other in an incident light. The image lights are further reflected on the inner surface of the curved surface in directions of right and left eyes of an observer. As a result, the observer can observe a three-dimensional image having a spatial effect light a real thing, a three-dimensional image with a high resolution can be displayed, and manufacture of the device can be facilitated.

Further, in the display device according to the present invention, a right-eye image and a left-eye image constituting one three-dimensional image are formed of linearly polarized lights and allowed to exit to the first and second display elements, and image lights of these images enter the curved screen from the outside of the curved surface thereof to be transmitted through the screen, the screen having optical characteristics of transmitting a linearly polarized light component parallel to the transmission axis and reflecting a linearly polarized light component parallel to the reflection axis in regard to two linearly polarized light components orthogonal to each other in an incident light, and these image lights are then reflected on the inner surface of the curved surface in directions of right and left eyes of an observer. As a result, the observer can observe a three-dimensional image having a spatial effect like a real thing.

In this display device, it is good enough to arrange the first image displaying means and the second image displaying means in such a manner that a direction of the transmission axis as seen from the rear surface side of the screen becomes substantially parallel with an oscillation direction of the linearly polarized light exiting from the first and second image displaying means when the exit surfaces of the first and second image displaying means face the rear surface of the screen. With such an arrangement, the linearly polarized light which has exited from each of the first and second image displaying means and entered the screen from the rear surface thereof can be transmitted through the screen to fall on an area of the screen opposite to the image displaying means side from the front surface thereof, and the light can be reflected by the screen to exit toward the observation side.

Further, in this display device according to the present invention, images having the same pattern are displayed in the first and second image displaying means, and image lights from these image displaying means are allowed to enter/fall on the screen from the front surface thereof. As a result, the image light exiting from one image displaying means is reflected by the front screen toward the observation side, and the image light exiting from the other image displaying means is transmitted through the front screen to be reflected toward the observation side by the rear screen. Thus, a display observer can observe an image having a depth in which the image reflected by the front screen and the image reflected by the rear screen area superposed, thereby displaying a stereoscopic image.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
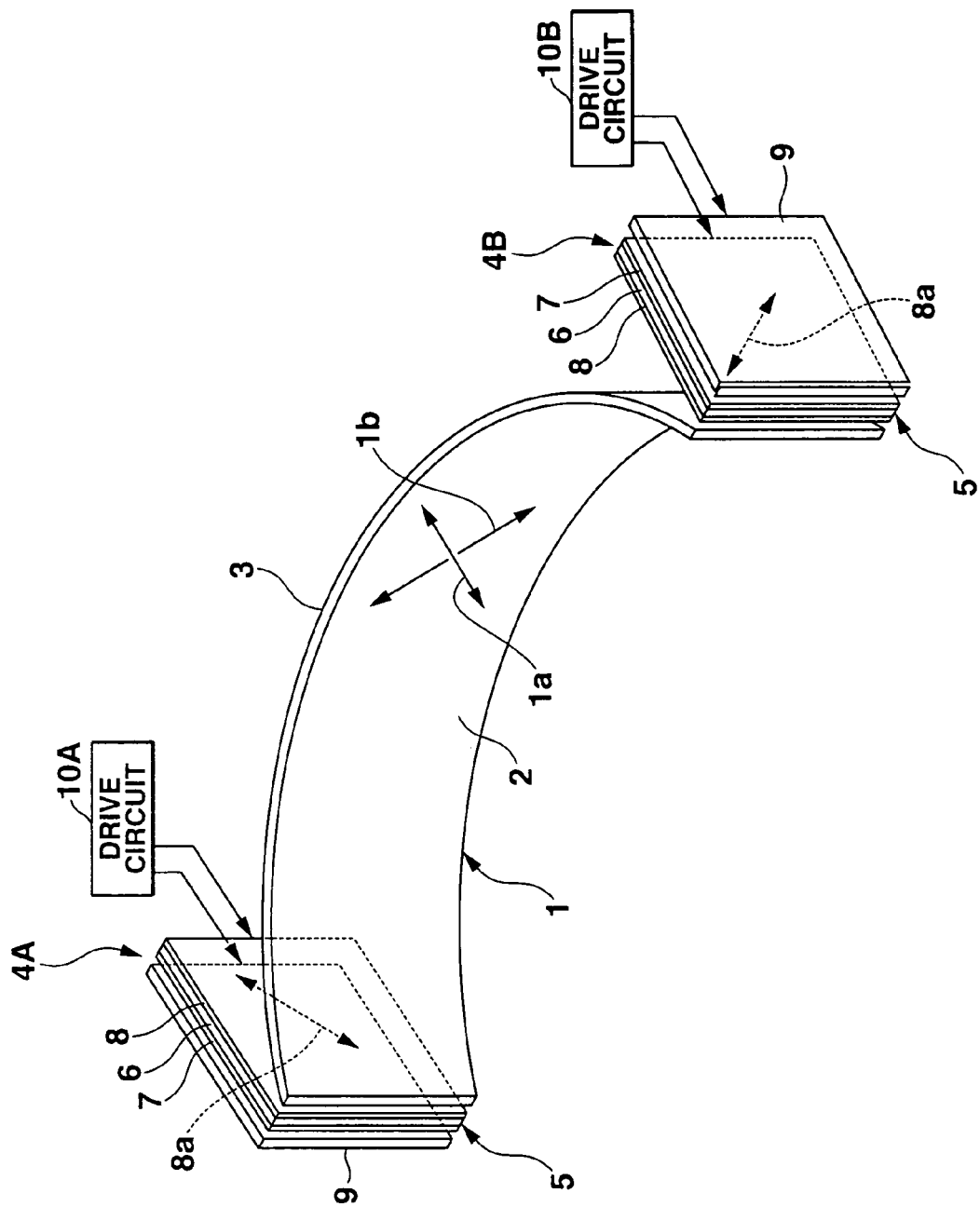
FIG. 1 is a perspective view of a display device according to a first embodiment of the present invention.
Figure 2:
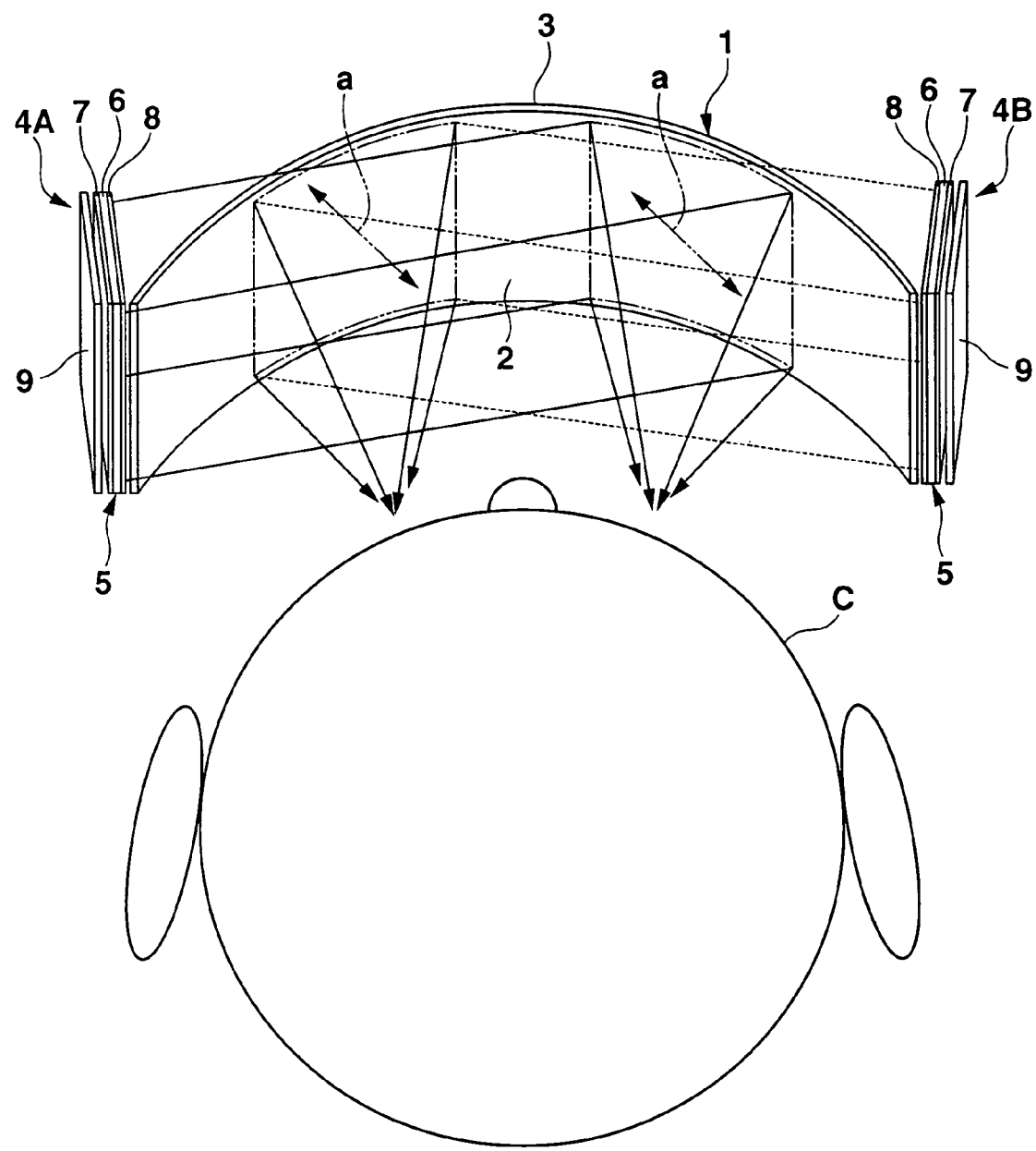
FIG. 2 is a schematic view showing a display state of a three-dimensional image obtained by the display device according to the first embodiment.

FIGS. 1 and 2 show a first embodiment according to the present invention. FIG. 1 is a perspective view of a display device and FIG. 2 is a schematic view showing a display state of a three-dimensional image obtained by the display device.

As shown in FIG. 1, this display device includes a screen 1 which has a film having a front surface 2 facing a display observation side and a rear surface 3 opposite to the front surface 2, and a transmission axis 1a and a reflection axis 1b in two directions orthogonal to each other along this film surface. The screen 1 has optical characteristics as described later the front surface 2 forms a semicylindrical curved surface which is curved toward a side opposite to the observation side in a protruding manner. First and second image display elements 4A and 4B are provided on opposite end sides of the screen 1. Each of the display elements has a liquid crystal display element 5 which controls transmission of a light to display an image and a surface light source 9 which supplies an illumination light to the liquid crystal display element, and allows an image light including of a linearly polarized light to exit therefrom. A display drive element is provided, which displays a right-eye image in one of the first and second image display elements 4A and 4B and displays a left-eye image in the other image display element.

The screen 1 is formed by a multiplayer film which is the same as a reflection polarizing film as one type of optical films and in which an isotropic thin film (a thin film which is optically isotropic) formed of a polyethylene naphthalate copolymer or the like and an anisotropic thin film (a thin film which is optically anisotropic) are alternately laminated in such a manner that directions in which a refraction factor of the anisotropic thin film becomes maximum are the same cross-sectional structure of the multiplayer is not shown.

The transmission axis 1a is parallel in a direction along which a refraction factor of the anisotropic thin film is the same as a refraction factor of the isotropic thin film. The reflection axis 1b is parallel in a direction along which a refraction factor of the anisotropic thin film is different from a refraction factor of the isotropic thin film, i.e., a direction orthogonal to the transmission axis 1a. The screen 1 demonstrates optical characteristics of transmitting a linearly polarized light component having a polarization plane parallel to the transmission axis 1a and reflecting a polarized light parallel to the reflection axis 1b in regard to two linearly polarized light components orthogonal to each other in an incident light from the both front and rear surfaces 2 and 3. This screen 1 will be referred to as a reflection polarizing screen hereinafter.

Furthermore, the liquid crystal display element 5 of each of the image display elements 4A and 4B includes a liquid crystal cell 6 having a plurality of pixels (not shown) arranged in a matrix form in a row direction and a column direction, and a pair of polarizing plates 7 and 8 on an incidence side and an exit side, which are arranged with the liquid crystal cell 6 therebetween.

The liquid crystal cell 6 is of an active matrix type using, e.g., a TFT (a thin film transistor) as an active element. Although its inner structure is not shown, a plurality of transparent pixel electrodes arranged in a matrix form in a row direction and a column direction, a plurality of TFTs connected to these pixel electrodes, a plurality of gate wirings which supply a gate signal to the TFTs of each row, and a plurality of data wirings which supply a data signal to the TFT of each column are provided on one of the opposing inner surfaces of the pair of transparent substrates opposing each other with the liquid crystal layer therebetween. Furthermore, one film-like transparent opposing electrode forming a plurality of pixels by areas facing the plurality of pixel electrodes is provided on the inner surface of the other substrate.

The liquid crystal display element 5 of each of the first and second image display elements 4A and 4B is, e.g., an TN (Twisted Nematic) type liquid crystal display element in which liquid crystal molecules in a liquid crystal layer of the liquid crystal cell 6 are twist-oriented at a twist angle of substantially 90 degrees between the pair of substrates. The polarizing plates 7 and 8 on the incidence side and the exit side are arranged in such a manner that their transmission axes are substantially orthogonal to each other or substantially parallel with each other.

Moreover, the surface light source 9 of each of the image display elements 4A and 4B emits a light having a homogeneous intensity distribution toward the entire screen area in which a plurality of pixels of the liquid crystal display element 5 are arranged in a matrix form. Although not shown in FIG. 1, the surface light source 9 includes an optical waveguide formed by a transparent plate. The transparent plate has an incidence end surface for a light at its one end surface, having an area facing the entire screen area of the liquid crystal display element 5, an exit surface formed on one plate surface and a reflection surface formed on the other plate surface which reflects a light which has entered the transparent plate from the incidence end surface to exit from the exit surface. A light source element such as a cold cathode-ray tube or a light emitting diode is arranged to face the incidence end surface of the optical waveguide.

The surface light source 9 is arranged on the incidence surface side of the liquid crystal display element 5 in such a manner that the exit surface of the optical waveguide closely faces an incidence surface (an outer surface of the incidence-side polarizing plate 7) of the liquid crystal display element 5.

That is, each of the first and second image display elements 4A and 4B allows a light emitted from the surface light source 9 to enter the liquid crystal display element 5 from the incidence surface side, and controls transmission of this light in accordance with image data (an electric field applied between the electrodes of respective pixels) written in each pixel of the liquid crystal cell 6 to display an image in the liquid crystal display element 5. An image light consisting of a linearly polarized light parallel to the transmission axis 8a of the exit-side polarizing plate 8 is allowed to exit from the exit surface of the liquid crystal display element 5.

Of the first and second image display elements 4A and 4B, the first image display element 4A is arranged on one end side of the reflection polarizing screen 1, e.g., outside the curved surface on the left end side as seen from the front surface side which is the observation side of screen 1 in such a manner that an exiting direction of the image light from this first image display element 4A is directed in a direction along which the image light is transmitted from the rear surface 3 at the end section of the screen 1 to enter an area facing the first image display element 4A side apart from the central part of the front surface 2 of the screen 1 in a state where an edge of the liquid crystal display element 5 on the left side as seen from the exit side is in close proximity to an edge of the screen 1. The second image display element 4B is arranged on the other end side of the reflection polarizing screen 1, i.e., the outside of the curved surface of on the right end side as seen from the front surface of the screen 1 in such a manner that an exiting direction of the image light from the second image display element 4B is directed in a direction along which the image light is transmitted from the end section of the screen 1 to enter an area facing to the second image display element 4B side apart from the central part of the front surface 2 of the screen 1 in a state where an edge of the liquid crystal display element 5 on the right side as seen from the exit side is in close proximity to an edge of the screen 1.

The display drive element displays a right-eye image in one of the first and second image display elements 4A and 4B, and displays a left-eye image in the other image display element. The drive element includes a first display drive circuit 10A which drives the first image display element 4A and a second display drive circuit 10B which drives the second image display element 4B.

Each of the display drive circuits 10A and 10B includes a display element drive section which sequentially selects each gate wiring of the liquid crystal cell 6 of the liquid crystal display element 5 in order to supply a gate signal to the selected wiring, supplies a data signal corresponding to image information for a right eye or a left eye supplied to each data wiring from the outside in accordance with selection of each gate wiring in order to write image data in each pixel. The drive circuit further includes surface light source drive section which turns on the light emitting element of the surface light source 9. The structure of these circuits is not shown. The display element drive section of the first display drive circuit 10A which drives the first image display element 4A is configured to write image data for a right-eye required to display two images forming one three-dimensional image in the liquid crystal display element 5 of the first image display element 4A, thereby displaying a right-eye image. The display element drive section of the second display drive circuit 10B which drives the second image display element 4B is configured to write image data for a left eye in the liquid crystal display element 5 of the second image display element 4B, thereby displaying a left-eye image.

The liquid crystal display element 5 of each of the first and second image display elements 4A and 4B may be a color image display element provided with color filters having three colors, i.e., red, green and blue corresponding to the plurality of pixels, or a field sequential display element which displays a color image without including color filters. When the liquid crystal display element 5 comprises the color image display element including color filters, it is good enough configure the surface light source 9 of each of the image display elements 4A and 4B to emit a white light and the first and second display drive circuits 10A and 10B to write image data of three colors, i.e., red, green and blue in respective pixels of the liquid crystal display element 5.

When the liquid crystal display element is a field sequential display element, it is good enough to adopt a configuration in which the surface light source 9 of each of the image display elements 4A and 4B selectively emits three color lights of red, green and blue, the first and second display drive circuits 10A and 10B sequentially write unit color image data of three colors, i.e., red, green and blue in respective pixels of the liquid crystal display element 5 during one frame required to display one color image and a light having a color corresponding to the unit color image data is emitted to exit from the surface light source 9 every time the unit color image data of each color is written.

Additionally, in this display device, a polarization plate (a direction parallel to the transmission axis 8a of the exit-side polarizing plate 8 of each of the image display element 4A and 4B), which is an oscillation plane of an electric vector of the linearly polarized light exiting from each of the image display element 4A and 4B and directions of the transmission axis 1a and the reflection axis 1b of the reflection polarizing screen 1 are set in such a manner that the linearly polarized light which has exited from each of the image display element 4A and 4B to fall on the screen 1 from the rear surface 3 thereof is transmitted through the screen 1 to enter the area opposite to this screen 1 from the front surface 2 thereof and this light is reflected by the screen 1 to exit toward the observation side.

That is, in this display device, the first image display element 4A and the second image display element 4B are arranged in such a manner that a direction of the transmission axis 1a as seen from the rear surface side of the screen 1 and the polarization plane of the linearly polarized light exiting from each of the image display elements 4A and 4B when the exit surface of each of the image display elements 4A and 4B faces the rear surface of the screen 1 become substantially parallel with each other.

In the display device according to this embodiment, a three-dimensional image is displayed in front of a face of a display observer C (see FIG. 2). The reflection polarizing screen 1 and the first and second image display elements 4A and 4B are provided to, e.g., a non-illustrated attachment body which is attached in front of the display observer C's eyes.

In the liquid crystal display device according to this embodiment, a right-eye image is displayed in the first image display element 4A arranged behind the left end side as seen from the front surface side of the reflection polarizing screen 1, and a left-eye image is displayed in the second image display element 4B arranged behind the right end side as seen from the front surface side of the reflection polarizing screen 1. These image lights enter the areas of the screen 1 facing the image display elements 4A and 4B from the rear surface 3 thereof. The right-eye image light which has exited from the image display element 4A, has been transmitted through the screen 1 and has fallen on the area of the front surface 2 opposite to the first image display element 4A side is reflected by the screen 1 toward a direction of the right eye of the display observer C. The left-eye image light which has exited from the second image display element 4B, has been transmitted through the screen 1 and has fallen on the area of the front surface 2 opposite to the second image display element 4B side is reflected by the screen 1 toward a direction of the left eye of the display observer C. In this manner, the display observer C can observe a three-dimensional image having a spatial effect light a real thing. In this liquid crystal display device, a curvature of the reflection polarizing screen 1 having the semicylindrical surface shape and a positional relationship between the reflection polarizing screen 1 and the first and second image display elements 4 and 4B are set in such a manner that a light which has exited from the first image display element 4A displays a right-eye image and has been transmitted through the screen 1 to fall on the front surface 2 thereof is reflected in a direction of the right eye of the display observer C, and a light which has exited from the second image display element 4B displays a left-eye image and has been transmitted through the screen 1 to fall on the front surface 2 thereof is reflected in a direction of the left eye of the display observer C.

Display of a three-dimensional image by this display device will be described with reference to FIG. 2. The right-eye image and the left-eye image which are sub-images required to form one three-dimensional image, are simultaneously displayed in the first image display element 4A and the second image display element 4B. Thus a three-dimensional image is displayed as a result of observation of these image by both eyes of an observer. That is, the right-eye image light exiting from the first image display element 4A enters the area of the screen 1 facing the first image display element 4A from the rear surface 3 thereof as indicated by solid lines in FIG. 2 representing paths of this light, and the left-eye image exiting from the second image display element 4B enters the area of the screen 1 facing the second image display element 4B from the rear surface 3 thereof as indicated by broken lines in FIG. 2 representing paths of this light.

Each of the right-eye image light and the left-eye image light is a linearly polarized light having a polarization plane parallel to the transmission axis 8a of the exit-side polarizing plate 8 of each liquid crystal display element 5. In this display device, a direction of the transmission axis 1a as seen from the rear surface 3 of the reflection polarizing screen 1 is substantially parallel with the polarization plane of the linearly polarized light exiting from each of the first and second image display elements 4A and 4B when the exit surface of each of the image display elements 4A and 4B faces the rear surface 3 of the screen 1. The polarization plane as seen from the exit side of the linearly polarized light exiting from the first image display element 4A is substantially parallel with the polarization plane as seen from the exit side of the linearly polarized light exiting from the second image display element 4B. Therefore, the linearly polarized light which has exited from the image display elements 4A and 4B and entered the screen 1 from each of the rear surface 3 thereof is transmitted through the screen 1 to fall on the area of the screen 1 on the opposite side from the front surface 2 thereof.

Further, since the polarization plane of the linearly polarized light which has been transmitted through this screen 1 to fall on the area of the front surface 2 on the opposite side is substantially parallel with the reflection axis 1$b$ as seen from the front surface 2 of the reflection polarizing screen 1 as indicated by each broken line arrow a in FIG. 2, the linearly polarized light which has been transmitted through the screen 1 to fall on the front surface 2 thereof is reflected toward the observation side by the screen 1.

In this display device, since the curvature of the reflection polarizing screen 1 and the positional relationship between the reflection polarizing screen 1 and the first and second image display elements 4A and 4B are set as described above, the right-eye image which has exited from the first image display element 4A and has been transmitted through the reflection polarizing screen 1 to fall on the area of the front surface 2 opposite to the first image display element 4A side is reflected in a direction of the right eye of the display observer C by the screen 1, and the left-eye image which has exited from the second image display element 4B and has been transmitted through the reflection polarizing screen 1 to fall on the area of the front surface 2 opposite to the second image display element 4B side is reflected in a direction of the left eye of the display observer C, thereby enabling the display observer C to observe a three-dimensional image having a spatial effect like a real thing.

As described above, in the display device, the first and second image display elements 4A and 4B which allow an image light consisting of a linearly polarized light to exit therefrom are arranged at the both ends of the curved surface on the outer side formed by the screen which is protrudingly curved toward the side opposite to the observation side of display in such a manner that image lights of a right-eye image and a left-eye image are transmitted from the outside toward the inside of the curved surface at the end sections of the screen means so that the inside of the curved surface of the screen means is irradiated with the image light and each image light is reflected by the inner side of the curved surface of the screen means to enter one of right and left eyes of an observer, the screen having the transmission axis and the reflection axis in two directions orthogonal to each other in a plane parallel to the film surface, having optical characteristics of transmitting a linearly polarized light component parallel to the transmission axis and reflecting a linearly polarized light component parallel to the reflection axis in regard to two linearly polarized light components orthogonal to each other in an incident light. Further, of the pair of polarizing plates of the first and second image display elements 4A and 4B, the polarizing plate arranged on the side facing the screen is arranged in such a manner that its transmission axis becomes substantially parallel with the transmission axis of the screen means. As a result, the right-eye image light exiting from the image display element 4A arranged on the left side is reflected in a direction of a right eye of the display observer C, and a left-eye image light exiting from the image display element 4B arranged on the right side is reflected in a direction of a left eye of the display observer C, enabling the display observer C to observe a three-dimensional image having a spatial effect like a real thing.

Therefore, according to this display device, the precise right-eye image and left-eye image having the same dot pitch as a pixel pitch of the liquid display element 5 can be displayed on each of the first and second image display elements, thereby displaying a three-dimensional image having a high resolution.

In the display device according to this embodiment, although the reflection polarizing film or plate is used as the screen, the present invention is not restricted to such a screen, and it is possible to use a polarization split element which includes a cholesteric liquid crystal layer, transmits one of a circularly polarized light plane in a clockwise direction and a circularly polarized light in a counterclockwise direction therethrough and reflects the other one of the same. In this case, it is good enough to arrange $\lambda/4$ or $\lambda/2$ retardation plate to the image display element or the polarization split element in order to convert a linearly polarized light into a circularly polarized light.

Furthermore, in the display device, not only the three-dimensional image but also a two-dimensional image can be displayed. In this case, the same image may be displayed in the both first and second image display elements 4A and 4B, or an image may be displayed in one of the image display elements 4A and 4B whilst the other image display element may be set in a non-display mode.

Moreover, although the reflection polarizing screen 1 is curved in a semicylindrical surface shape in this embodiment, this reflection polarizing screen 1 is not restricted to the cylindrical surface shape and may be curved in a spherical surface shape.

Additionally, although the display device according to this embodiment displays a three-dimensional image in front of a face of the display observer C, the present invention can be applied to a display device which displays a three-dimensional image at a position distanced from an observation position of the display observer to some extent. In this case, the reflection polarizing screen 1 and the first and second image display elements 4A and 4B may be supported by, e.g., a floor mounted type or wall mounted type frame, and a curvature of the screen 1 may be set in such a manner that a light which has exited from the image display element which displays a right-eye image and has been transmitted through the screen 1 to fall on the front surface 2 thereof is reflected in a direction of a right eye of the display observer and a light which has exited from the image display element which displays a left-eye image and has been transmitted through the screen 1 to fall on the front surface 2 is reflected in a direction of a left eye of the display observer.

Second Embodiment

Figure 3:
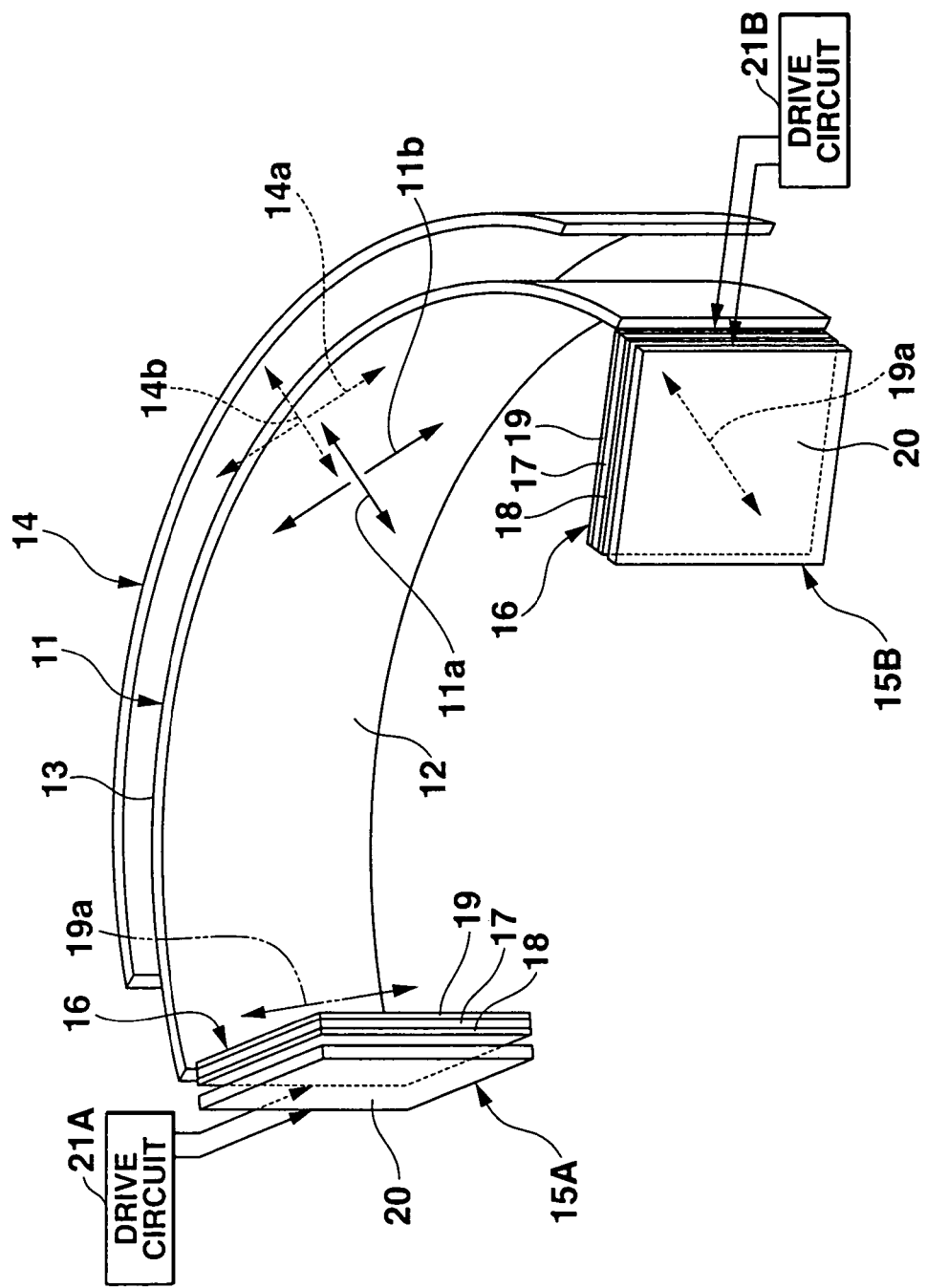
FIG. 3 is a perspective view of a display device according to a second embodiment of the present invention.
Figure 4:
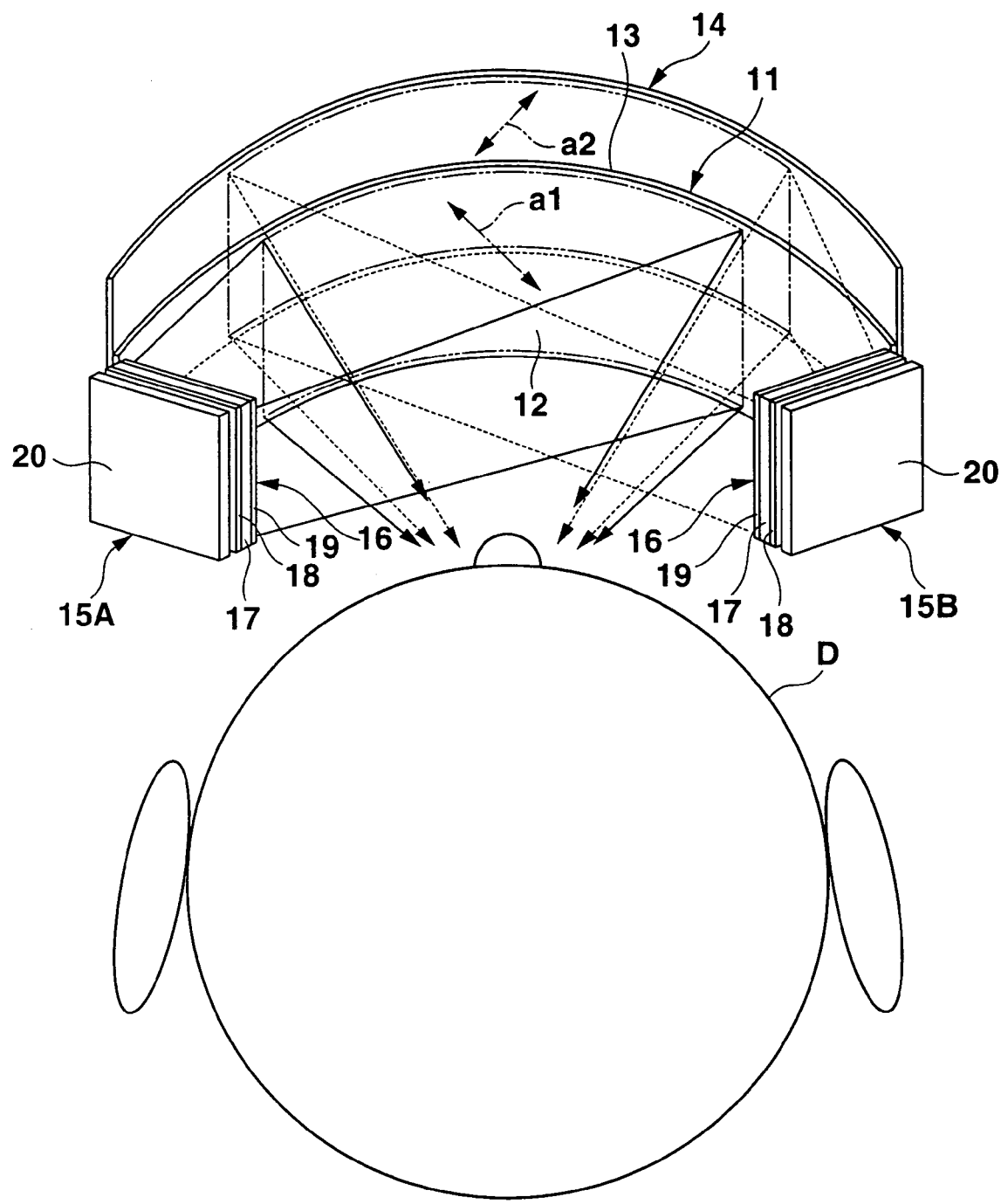
FIG. 4 is a schematic view showing a display state of a three-dimensional image obtained by the display device according to the second embodiment.

FIGS. 3 and 4 show a second embodiment according to the present invention. FIG. 3 is a perspective view of a display device and FIG. 4 is a schematic view showing a display state of a three-dimensional image obtained by the display device.

As shown in FIG. 3, the display device according to this embodiment includes a front screen 11 which is formed of a film having a front surface 12 facing an observation side of display and a rear surface 13 on the opposite side, has a transmission axis 11$a$ and a reflection axis 11$b$ in two directions orthogonal to each other along its film surface and has optical characteristics of transmitting a linearly polarized light component parallel to the transmission axis and reflecting a linearly polarized light component parallel to the reflection axis 11b in regard to two linearly polarized light components orthogonal to each other in an incident light. A rear screen 14 is arranged on the rear side of the front screen 11 with a gap therebetween and reflects a light transmitted through the front screen 11 in lights which has entered/fallen on the front screen 11 from the front surface 12 thereof. First and second image display elements 15A and 15B are arranged, each having a liquid crystal display element 16 which controls transmission of a light to display an image and a surface light source 20 which supplies a light to the liquid crystal display element 16. There is provided a display drive element which displays images having the same pattern in the first and second image display elements 15A and 15B.

Each of the front screen 11 and the rear screen 14 is substantially the same reflection polarizing film as the reflection polarizing screen 1 in the first embodiment. The rear screen 14 has the reflection axis 14b in a direction substantially parallel with the transmission axis 11a of the front screen 11 and the transmission axis 14a in a direction substantially parallel with the reflection axis 11b of the front screen 11. The front screen 11 will be referred to as a front reflection polarizing screen and the rear screen 14 will be referred to as a rear reflection polarizing screen hereinafter.

Additionally, in this embodiment, each of the front reflection polarizing screen 11 and the rear reflection polarizing screen 14 is determined as a screen having a semicylindrical surface shape formed into a curved surface which protrudes toward the side opposite to the observation side of display.

Further, the liquid crystal display element 16 of each of the first and second image display elements 15A and 15B includes a liquid crystal cell 17 having a plurality of pixels (not shown) arranged in a matrix form in row and column directions, and a pair of polarizing plates 18 and 19 on an incidence side and an exit side arranged with this liquid crystal cell 17 therebetween.

It is to be noted that the liquid crystal display element 16 of each of the image display elements 15A and 15B is, e.g., a TN type active matrix liquid crystal display element, and its configuration is the same as the liquid crystal display element 5 of each of the first and second image display elements 4A and 4B in the first embodiment.

Furthermore, the surface light source 20 of each of the image display elements 15A and 15B has the same configuration as the surface light source 9 of each the image display elements 4A and 4B in the first embodiment. This surface light source 20 is arranged on the incidence surface side of the liquid crystal display element 16 in such a manner that an exit surface of the optical waveguide closely faces the incidence surface (an outer surface of the incidence-side polarizing plate 18) of the liquid crystal display element 16.

That is, each of the image display elements 15A and 15B allows a light exiting from the surface light source 20 to enter the liquid crystal display element 16 from the incidence surface side thereof and controls image data (an electric field applied between electrodes of respective pixels) written in respective pixels of the liquid crystal cell 17 to display an image in the liquid crystal display element 16. Each image display element allows an image light consisting of a linearly polarized light parallel to the transmission axis 19a of the exit-side polarizing plate 19 to exit from the exit surface of the liquid crystal display element 16.

Of the first and second image display elements 15A and 15B, the first image display element 15A is arranged on one end side of the front reflection polarizing screen 11, e.g., the inner side of the curved surface on the left end side as seen from the front surface side of the front reflection polarizing screen 11 in such a manner that an exiting direction of the image light from the first image display element 15A is directed toward the front surface 12 of the front reflection polarizing screen 11 in a state where a right-side edge as seen from the exit side of the liquid crystal display element 16 is in close proximity to an edge of the front reflection polarizing screen 11. The second image display element 15B is arranged on the other end side of the front reflection polarizing screen 11, i.e., the inner side of the curved surface on the right end side as seen from the front surface side of the front reflection polarizing screen 11 in such a manner that an exiting direction of the image light from this second image display element 15B is directed toward the front surface 12 of the front reflection polarizing screen 11 in a state where a left-side edge as seen from the exit side of the liquid crystal display element 16 is in close proximity to an edge of the front reflection polarizing screen 11.

Moreover, in this display device, a polarization plane of the linearly polarized light exiting from one of the image display elements 15A and 15B, e.g., the first image display element 15A arranged on the left end side of the front reflection polarizing screen 11 (a direction parallel to the transmission axis 19a of the exit-side polarizing plate 19 of the liquid crystal display element 16 of the first image display element 15A) is set to be substantially parallel with the reflection axis 11b of the front reflection polarizing screen 11, and a polarization plane of the linearly polarized light exiting from the other image display element, i.e., the second image display element 15B arranged on the right end side of the front reflection polarizing screen 11 (a direction parallel to the transmission axis 19a of the exit-side polarizing plate 19 of the liquid crystal display element 16 of the second image display element 15B) is set to be substantially parallel with the transmission axis 11a of the front reflection polarizing screen 11.

Furthermore, the display drive element which displays images having the same pattern in the first and second image display elements 15A and 15B includes a first display drive circuit 21A which drives the first image display element 15A and a second display drive circuit 21B which drives the second image display element 15B.

Although the configuration of each of the display drive circuits 21A and 21B is not shown, each display drive circuit includes a display element drive section and a surface light source drive section. The display element drive section sequentially selects each gate wiring of the liquid crystal cell 17 of the liquid crystal display element 16 to supply a gate signal and supplies a data signal corresponding to image information fed from the outside to each data wiring in accordance with selection of each gate wiring in order to write image data in each pixel. The surface light source drive section turns on a light emitting element of the surface light source 20. The display element drive section of each of the display drive circuits 21A and 21B is configured to write the same image data in the liquid crystal display element 16 of the first image display element 15A and the liquid crystal display element 16 of the second image display element 15B.

Moreover, the surface light source drive section of each of the first and second display drive circuits 21A and 21B is configured to be capable of adjusting an intensity of a light emitted from the surface light source 20 (an intensity of light emitted from the light emitting element), and the surface light source drive section of the second display drive circuit is configured to allow a light having an intensity lower than that of a light exiting from the surface light source 20 of the first image display element 15A to exit from the surface light source 20 of the second image display element 15B.

That is, the display drive element comprising the first or second display drive circuit 21A or 21B is configured to display an image in the first or second image display element 15A or 15B, the image having the same pattern but the display brightness of the image in the second image display element 15B which allows a linearly polarized light substantially parallel with the transmission axis 11a of the front reflection polarizing screen 11 to exit therefrom being lower than the display brightness of the image in the first image display element 15A which allows a linearly polarized light substantially parallel to the reflection axis 11b of the front reflection polarizing screen 11 to exit therefrom.

It is to be noted that, as a method of reducing the display brightness in the second image display element 15B to be lower than the display brightness in the first image display element 15A, a voltage value of a data signal supplied to the liquid crystal display element 16 of the first image display element 15A may be set as a value different from a voltage value of a data signal supplied to the liquid crystal display element 16 of the second image display element 15B so that transmission factors of the respective liquid crystal display elements 16 can be controlled to have different values. In this embodiment, in order to simplify display driving, intensities of lights exiting from the surface light sources 20 of the first and second image display elements 15A and 15B have different values as described above.

It is to be noted that, in the display device according to this embodiment, the liquid crystal display element 16 of each of the first and second image display elements 15A may be a color image display element including color filters of three colors, i.e., red green and blue or a field sequential display element which displays a color image without including color filters. It is good enough to configure the first and second display drive circuits 21A and 21B in accordance with such elements as described in conjunction with the first embodiment.

Further, the display device according to this embodiment displays a three-dimensional image in front of a face of a display observer D (see FIG. 4), and the front reflection polarizing screen 11, the rear reflection polarizing screen 14 and the first and second image display elements 15A and 15B are provided to, e.g., a non-illustrated attachment body which is attached in front of eyes of the display observer D.

In the display device according to this embodiment, images having the same pattern are displayed in the first and second image display elements 15A and 15B, and image lights from the these image display elements 15A and 15B are allowed to enter/fall on the front reflection polarizing screen 11 from the front surface 12 thereof. As a result, the image light exiting from the first image display element 15A is reflected toward the observation side by the front reflection polarizing screen 11, and the image light exiting from the second image display element 15B is transmitted through the front reflection polarizing screen 11 to be reflected toward the observation side by the rear reflection polarizing screen 14. Consequently, a reflected image obtained by the front reflection polarizing screen 11 and a reflected image obtained by the rear reflection polarizing screen 14 are superposed and displayed to the display observer D, and these two images are combined with each other, thereby enabling the display observer to observe a three-dimensional image having a depth. In this display device, curvatures of the front and rear reflection polarizing screens 11 and 14 having a cylindrical surface shape and a positional relationship between these reflection polarizing screens 11 and 14 and the first and second image display elements 15A and 15B are set in such a manner that a reflected image obtained by the front reflection polarizing screen 11 and a reflected image obtained by the rear reflection polarizing screen 14 seem superimposed.

Giving a description on display of a three-dimensional image obtained by this display device with reference to FIG. 4, this display device simultaneously displays images in the first image display element 4A and the second image display element 4B, the images having the same pattern but the brightness of the image in the second image display element 15B being lower than the brightness of the image in the first image display element 15A. An image light exiting from the first image display element 15A arranged on the left end side of the front reflection polarizing screen 11 falls on the front reflection polarizing screen 11 from the front surface 12 thereof as indicated by solid lines in FIG. 4 representing paths of this image light, and an image light exiting from the second image display element 15B arranged on the right end side of the front reflection polarizing screen 11 enters the front reflection polarizing screen 11 from the front surface 12 thereof as indicated by broken lines in FIG. 4 representing paths of this image light.

Each of these lights is a linearly polarized light having a polarization plane parallel to the transmission axis 19a of the exit-side polarizing plate 19 of the liquid crystal display element 16 of each of the first and second image display elements 15A and 15B. In this display device, the polarization plane of the linearly polarized light exiting from one of the first and second image display elements 15A and 15B, i.e., the first image display element 15A is substantially parallel with the reflection axis 11B of the front reflection polarizing screen 11 as indicated by a broken line arrow a1 in FIG. 4, and the polarization plane of the linearly polarized light exiting from the second image display element 15B is substantially parallel with the transmission axis 11a of the front reflection polarizing screen 11 as indicated by a broken line arrow a2 in FIG. 4. Therefore, the linearly polarized light which has exited from the first image display element 15A and has fallen on the front reflection polarizing screen 11 from the front surface 12 thereof is reflected toward the observation side by the front reflection polarizing screen 11. The linearly polarized light which has exited from the second image display element 15B and entered the front reflection polarizing screen 11 from the front surface 12 thereof is transmitted through this front reflection polarizing screen 11 to fall on the rear reflection polarizing screen 14.

Furthermore, in this display device, since the reflection axis 14b of the rear reflection polarizing screen 14 is substantially parallel with the transmission axis 11a of the front reflection polarizing screen 11, a linearly polarized light which has exited from the second image display element 15b and has been transmitted through the front reflection polarizing screen 11 to fall on the rear reflection polarizing screen 14 is reflected toward the observation side by this rear reflection polarizing screen 14 and again transmitted through the front reflection polarizing screen 11 to exit toward the observation side.

In this display device, the curvatures of the front and rear reflection polarizing screens 11 and 14 and the positional relationship between both screens 11 and 14 and the first and second image display elements 15A and 15B are set in such a manner that a reflected image obtained by the front reflection polarizing screen 11 and a reflected image obtained by the rear reflection polarizing screen 14 seem superimposed. Therefore, the display observer D can observe a three-dimensional image having a depth in which an image which has exited from the first image display element 15A and has been reflected toward the observation side by the front reflection polarizing screen 11 and an image which has exited from the second image display element 15B and has been reflected toward the observation side by the rear reflection polarizing screen 14 are superposed with a very small deviation corresponding to a display observation angle.

Moreover, in this display device, as described above, since images having the same pattern but the brightness which is lower in the second image display element 15B than in the first image display element 15A are displayed in the first image display element 4A and the second image display element 4B. Therefore, it is possible to display a three-dimensional image having an emphasized or deep depth in which an image having a high brightness which has exited from the first image display element 15A and has been reflected toward the observation side by the front reflection polarizing screen 11 and an image having a low brightness which has exited from the second image display element 15B and has been reflected toward the observation side by the rear reflection polarizing screen 14 are superposed with a small deviation.

Since the depth of the three-dimensional image is emphasized as a difference in brightness between display images of the first and second image display elements 15A and 15B is increased, a three-dimensional image having an arbitrary depth can be displayed by adjusting the difference in brightness between the both display images.

As described above, the display device is constructed by the following elements. The front reflection polarizing screen 11 has the transmission axis 11a and the reflection axis 11b in two directions orthogonal to each other and has optical characteristics of transmitting a linearly polarized light component parallel to the transmission axis 11a and reflecting a linearly polarized light component parallel to the reflection axis 11b in regard to two linearly polarized light components orthogonal to each other in an incident light. The rear reflection polarizing screen 14 is arranged behind the front reflection polarizing screen 11 with a gap therebetween and reflects a light transmitted through the front screen 11 of lights which have entered/fallen on the screen 11 from the front surface 12 thereof. The first and second image display elements 15A and 15B have the liquid crystal display elements each of which controls transmission of a light to display an image and the surface light source which supplies a light to the liquid crystal display element. Each display element is arranged at each of both ends of the front and rear reflection polarizing screens 11 and 14 on the observation side in such a manner that each image light exiting from each liquid crystal display element toward the front side of the front and rear screens 11 and 14 is reflected by one of the screens 11 and 14 to exit toward the observation side, and allows an image light consisting of a linearly polarized light from each liquid crystal display element to exit therefrom. Moreover, the polarization plane of the linearly polarized light exiting from one of the first and second image display elements 15A and 15B is set to be substantially parallel with the reflection axis of the front reflection polarizing screen, and the polarization plane of the linearly polarized light exiting from the other image display element is set to be substantially parallel with the transmission axis of the rear reflection polarizing screen. Images having the same pattern are displayed in the first and second image display elements 15A and 15B, and the image lights from these image display elements 15A and 15B are allowed to enter/fall on the front reflection polarizing screen 11 from the front surface 12 thereof. As a result, the image light exiting from one image display element 15A is reflected toward the observation side by the front reflection polarizing screen 11, and the image light exiting from the other image display element 15B is transmitted through the front screen 11 and reflected toward the observation side by the rear reflection polarizing screen 14. Consequently, the display observer D can observe a three-dimensional image having a depth in which the reflected image obtained by the front screen 11 and the reflected image obtained by the rear screen 14 are superposed.

Therefore, according to this display device, precise images having the same dot pitch as a pixel pitch of each liquid crystal display element 16 can be displayed in the first and second image display elements 15A and 15B, thereby displaying a three-dimensional image with a high resolution.

Additionally, in this display device, images having the same pattern are displayed in the first and second image display elements 15A and 15B, an image light exiting from one image display element 15A is reflected toward the observation side by the front reflection polarizing screen 11, and an image light exiting from the other image display element 15B is transmitted through the front reflection polarizing screen 11 and reflected toward the observation side by the rear reflection polarizing screen 14. Therefore, it is good enough to set the positional relationship between the front and rear reflection polarizing screens 11 and 14 and the first and second image display elements 15A and 15B in such a manner that the reflected image obtained by the front screen 11 and the reflected image obtained by the rear screen 14 seem superposed, and hence the display device can be readily manufactured.

Further, in the display device according to the foregoing embodiment, the display drive element comprising the first and second display drive circuits 21A and 21B is configured as follows. Images whose brightness is lower in the second image display element 15B than in the first image display element 15B are displayed in the first and second image display elements 15A and 15B, the first image display element 15A allowing a linearly polarized light substantially parallel with the reflection axis 11b of the front reflection polarizing screen 11 to exit therefrom and the second image display element 15B allowing a linearly polarized light substantially parallel with the transmission axis 11a of the front reflection polarizing screen 11 to exit therefrom. Therefore, a three-dimensional image having an emphasized depth can be displayed.

Furthermore, in the display device according to the foregoing embodiment, each of the front reflection polarizing screen 11 and the rear reflection polarizing screen 14 is formed into a curved surface which is protrudingly curved toward the side opposite to the display observation side. Therefore, an image light reflected by the front screen 11 and an image light reflected by the rear screen 14 can be condensed in front of the central parts of the screens 11 and 14, thereby displaying a brighter three-dimensional image.

It is to be noted that the display device can display not only the three-dimensional image but also a two-dimensional image. In the later case, it is good enough to display an image having the high brightness in one of the first and second image display elements 15A and 15B and set the other image display element in a non-display mode.

Moreover, the display device can display a three-dimensional image having a deep depth in the entire screen and also display a three-dimensional image having a deep depth in a predetermined area in the screen. For example, an image having a low brightness is displayed in the entire screen of one image display element 15 allowing a linearly polarized light substantially parallel with the reflection axis 11b of the front reflection polarizing screen 11 to exit therefrom, an image which has a high brightness and the same pattern as that of the displayed image in a corresponding part of one image display element 15A is displayed in a part of the screen of the other image display element 15B which allows a linearly polarized light substantially parallel with the transmission axis 11a of the front reflection polarizing screen 11 to exit therefrom, and a black color is displayed in the remaining area of the screen of the other image display element 15B. As a result, it is possible to display an image that a part of the screen can be seen as a three-dimensional image having a deep depth and the remaining area can be seen as the two-dimensional background image.

Additionally, an image representing a foreground is displayed in one image display element 15A which allows a linearly polarized light substantially parallel with the reflection axis 11b of the reflection polarizing screen 11 to exit therefrom, and a background image is displayed in the other image display element 15B. As a result, a foreground image which can be stereoscopically seen in the background image can be displayed, thereby display an image having a deep depth.

Further, although each of the front and rear reflection polarizing screens 11 and 14 is curved in a part-cylindrical surface shape in the display device according to the foregoing embodiment, these screens 11 and 14 are not restricted to the screen having a part-cylindrical surface shape, and they may be, e.g., a screen having a part-spherical surface shape as long as an image in which reflected images obtained by the both screens 11 and 14 are superposed can be displayed to a display observer.

Furthermore, in the foregoing embodiment, the rear screen 14 is determined as the reflection polarizing screen having the reflection axis 14b in a direction substantially parallel with the transmission axis 11a of the front screen 11 and having the transmission axis 14a in a direction substantially parallel with the reflection axis 11b of the front screen 11. However, a light reflected by this rear screen 14 is a linearly polarized light substantially parallel with the transmission axis 11a of the front screen 11, and hence the rear screen 14 may be a reflecting screen provided with a mirror film.

Moreover, although the display device according to the foregoing embodiment displays a three-dimensional image in front of a face of the display observer D, the present invention can be also applied to a display device which displays a three-dimensional image at a position distanced from an observation position of the display observer to some extent. In this case, supporting the front and rear reflection polarizing screens 11 and 14 and the first and second image display elements 15A and 15B by using, e.g., a floor mounted or wall mounted type frame can suffice.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A display device comprising:
    a screen comprising an optical film having optical characteristics such that the optical film transmits light that is in a first polarized state and reflects light that is in a second polarized state, wherein the optical film has opposite first and second ends and first and second portions at a first end side of the optical film and second end side of the optical film, respectively, and is curved between the opposite ends such that the optical film includes a curved inner surface to face a display observer and a curved outer surface to face away from the display observer, said optical film being curved in a manner such that: (i) the first portion of the optical film transmits light in the first polarized state and reflects light in the second polarized state, and (ii) the second portion of the optical film transmits light in the second polarized state and reflects light in the first polarized state, and wherein the light incident on the curved outer surface at the first portion of the optical film is in the first polarization state and the light incident on the curved outer surface at the second portion of the optical film is in the second polarization state;
    a first display element which is positioned to face the curved outer surface of the curved optical film at the first portion of the curved optical film; and
    a second display element which is positioned to face the curved outer surface of the curved optical film at the second portion of the curved optical film;
    wherein the first and second display elements respectively display first and second distinct sub-images which together constitute an image, wherein sub-light which corresponds to the first sub-image and which is in the first polarization state is incident on the curved outer surface at the first portion of the optical film and transmitted through the optical film to be incident on and reflected by the curved inner surface at the second portion of the optical film, wherein sub-light which corresponds to the second sub-image and which is in the second polarization state is incident on the curved outer surface at the second portion of the optical film and transmitted through the optical film to be incident on and reflected by the curved inner surface at the first portion of the optical film, and wherein the sub-light of the first and second sub-images reflected by the curved inner surface of the optical film is adapted to be incident on right and left eyes of the display observer, respectively.

2. The display device according to claim 1, wherein the first display element emits the sub-light therefrom such that the sub-light is linearly polarized light having a polarization plane in a first predetermined direction, and the second display element emits the sub-light therefrom such that the sub-light is linearly polarized light having a polarization plane in a second predetermined direction; and
    wherein the optical film comprises a reflection polarizing film which has a transmission axis and a reflection axis orthogonal to the transmission axis in a plane parallel to a surface of the optical film, and the optical characteristics of the optical film comprise, with respect to two linearly polarized light components orthogonal to each other, transmitting a linearly polarized light component parallel to the transmission axis and reflecting a linearly polarized light component parallel to the reflection axis.

3. The display device according to claim 2, wherein the respective sub-light of the first and second sub-images reflected by the curved inner surface of the optical film to be incident on right and left eyes of the display observer together form a three-dimensional image visible to the display observer.

4. The display device according to claim 2, wherein the first and second display elements are positioned and the optical film is curved such that: (i) at the first portion of the optical film the transmission axis of the optical film is substantially parallel to the polarization plane of the sub-light from the first display element, and (ii) at the second portion of the optical film the transmission axis of the optical film is substantially parallel to the polarization plane of the sub-light from the second display element.

5. The display device according to claim 2, wherein each of the first and second display elements comprises:
   a liquid crystal display element including a pair of polarizing plates, and a liquid crystal cell which is positioned between the polarizing plates and which includes a pair of substrates having electrodes formed on opposing inner surfaces thereof and a liquid crystal arranged between the pair of substrates; and
   a light source which is arranged on an opposite side of the liquid crystal element with respect to the screen and which emits illumination light that enters the liquid crystal display element.

6. The display device according to claim 5, wherein, in each of the first and second display elements, one of the polarizing plates, of the pair of polarizing plates, that has a transmission axis that is substantially parallel to the transmission axis of the optical film at the portion of the optical film facing the display element is positioned on a side of the liquid crystal cell facing the optical film.

7. The display device according to claim 5, wherein, in each of the first and second display elements, the light source comprises a surface light source which irradiates substantially an entire surface of the liquid crystal display element with a light having an even brightness.

8. The display device according to claim 1, further comprising a display drive circuit to drive the first and second display elements to display the respective sub-images.

9. A display device comprising:
   a screen comprising an optical film having a transmission axis and a reflection axis orthogonal to the transmission axis in a plane parallel to a surface of the optical film, such that the optical film has optical characteristics of, with respect to two linearly polarized light components orthogonal to each other, transmitting a linearly polarized light component parallel to the transmission axis and reflecting a linearly polarized light component parallel to the reflection axis, wherein the optical film has opposite first and second ends and first and second portions at a first end side of the optical film and second end side of the optical film, respectively, and is curved between the opposite ends such that the optical film includes a curved inner surface to face a display observer and a curved outer surface to face away from the display observer;
   first displaying means for displaying a right-eye image, wherein the first displaying means is positioned to face the curved outer surface of the curved optical film at the first portion of the curved optical film, the first displaying means comprises a liquid crystal display element which controls transmission of light to display the right-eye image and a light source which supplies the light to the liquid crystal display element, and right-eye image light corresponding to the right-eye image is emitted from the first displaying means and comprises linearly polarized light having a polarization plane in a first predetermined direction;
   second displaying means for displaying a left-eye image, wherein the second displaying means is positioned to face the curved outer surface of the curved optical film at the second portion of the curved optical film, the second displaying means comprises a liquid crystal display element which controls transmission of light to display the left-eye image and a light source which supplies the light to the liquid crystal display element, and left-eye image light corresponding to the left-eye image is emitted from the second displaying means and comprises linearly polarized light having a polarization plane in a second predetermined direction;
   display driving means for driving the first displaying means and the second displaying means to display the right-eye image and the left-eye image, respectively, said right-eye image and said left-eye image together forming a three-dimensional image;
   wherein the first and second display elements are positioned and the optical film is curved such that: (i) at the first portion of the optical film the transmission axis of the optical film is substantially parallel to the polarization plane of the right-eye light emitted from the first displaying means such that the right-eye light which is emitted from the first displaying means is incident on the curved outer surface at the first portion of the optical film and transmitted through the optical film to be incident on the curved inner surface at the second portion of the optical film, (ii) at the second portion of the optical film the reflection axis is substantially parallel to the polarization plane of the right-eye light transmitted through the first portion of the optical film, such that the right-eye light incident on the curved inner surface at the second portion of the optical film is reflected to be incident on a right eye of the display observer, (iii) at the second portion of the optical film the transmission axis of the optical film is substantially parallel to the polarization plane of the left-eye light emitted from the second displaying means such that the left-eye light which is emitted from the second displaying means is incident on the curved outer surface at the second portion of the optical film and transmitted through the optical film to be incident on the curved inner surface at the first portion of the optical film, and (iv) at the first portion of the optical film the reflection axis is substantially parallel to the polarization plane of the left-eye light transmitted through the second portion of the optical film, such that the left-eye light incident on the curved inner surface at the first portion of the optical film is reflected to be incident on a left eye of the display observer.

10. The display device according to claim 9, wherein, in each of the first and second displaying means:
   the liquid crystal display element comprises a pair of polarizing plates, and a liquid crystal cell which is positioned between the polarizing plates and which includes a pair of substrates having electrodes formed on opposing inner surfaces thereof and a liquid crystal arranged between the pair of substrates; and
   one of the polarizing plates, of the pair of polarizing plates, that has a transmission axis that is substantially parallel to the transmission axis of the optical film at the portion of the optical film facing the displaying means is positioned on a side of the liquid crystal cell facing the optical film.

* * * * *